(12) United States Patent
Illy et al.

(10) Patent No.: US 10,713,877 B2
(45) Date of Patent: Jul. 14, 2020

(54) SYSTEM AND METHOD TO OBTAIN AND OPTIMIZE MIXTURES FOR PREPARING BEVERAGES

(71) Applicant: ILLYCAFFE' S.P.A. CON UNICO SOCIO, Trieste (IT)

(72) Inventors: Andrea Illy, Trieste (IT); Riccardo Piras, Monza (IT); Luca Troisi, Turin (IT); Guido Guaschino, San Maurizio Canavese (IT); Roberto Maggio, Turin (IT); Furio Suggi Liverani, Trieste (IT)

(73) Assignee: ILLYCAFFE' S.P.A. CON UNICO SOCIO, Trieste (IT)

( * ) Notice: Subject to any disclaimer, the term of this patent is extended or adjusted under 35 U.S.C. 154(b) by 555 days.

(21) Appl. No.: 14/692,186

(22) Filed: Apr. 21, 2015

(65) Prior Publication Data

US 2016/0055599 A1    Feb. 25, 2016

(30) Foreign Application Priority Data

Aug. 22, 2014  (IT) .............................. UD2014A0146

(51) Int. Cl.
| | |
|---|---|
| *A47J 31/00* | (2006.01) |
| *G07F 9/00* | (2006.01) |
| *A47J 31/52* | (2006.01) |
| *G07F 13/06* | (2006.01) |
| *G07F 9/02* | (2006.01) |
| *C12C 13/00* | (2006.01) |
| *G06Q 30/06* | (2012.01) |
| *G06Q 50/12* | (2012.01) |

(Continued)

(52) U.S. Cl.
CPC .............. *G07F 9/006* (2013.01); *A47J 31/40* (2013.01); *A47J 31/4414* (2013.01); *A47J 31/52* (2013.01); *A47J 31/521* (2018.08); *A47J 31/525* (2018.08); *A47J 31/5251* (2018.08); *A47J 31/5253* (2018.08); *A47J 31/56* (2013.01); *C12C 13/00* (2013.01); *G06Q 30/0621* (2013.01); *G06Q 30/0635* (2013.01); *G06Q 30/0643* (2013.01); *G06Q 50/12* (2013.01); *G07F 9/023* (2013.01); *G07F 13/065* (2013.01); *A47J 31/401* (2013.01); *A47J 31/402* (2013.01); *A47J 31/404* (2013.01); *A47J 31/41* (2013.01); *A47J 31/4492* (2013.01); *C12C 13/10* (2013.01)

(58) Field of Classification Search
CPC ................................. G06Q 50/12; A47J 31/00
USPC ........................................................ 705/15
See application file for complete search history.

(56) References Cited

U.S. PATENT DOCUMENTS

| | | | |
|---|---|---|---|
| 6,759,072 B1 | 7/2004 | Gutwein et al. | |
| 8,688,277 B2 * | 4/2014 | Studor | A47J 31/44 422/62 |

(Continued)

FOREIGN PATENT DOCUMENTS

| | | |
|---|---|---|
| EP | 2392239 B1 | 3/2015 |
| WO | 2012045860 A1 | 4/2012 |

*Primary Examiner* — Luna Champagne
(74) *Attorney, Agent, or Firm* — Calfee, Halter & Griswold LLP

(57) ABSTRACT

A device to produce personalized mixtures of substances is configured to be controlled by computer program code running on a user terminal. The computer program code enables a user of the user terminal to create and personalize the formulas for optimizing the beverage according to the specific needs of the user and order the beverages from a remote location.

24 Claims, 15 Drawing Sheets

(51) Int. Cl.
  *A47J 31/40*  (2006.01)
  *A47J 31/44*  (2006.01)
  *A47J 31/56*  (2006.01)
  *C12C 13/10*  (2006.01)
  *A47J 31/41*  (2006.01)

(56) References Cited

U.S. PATENT DOCUMENTS

| | | | |
|---|---|---|---|
| 8,863,649 | B1 | 10/2014 | Rao et al. |
| 2003/0079612 | A1* | 5/2003 | Con .................... A47J 31/4485 |
| | | | 99/275 |
| 2008/0201241 | A1* | 8/2008 | Pecoraro ................ G06Q 30/06 |
| | | | 705/26.8 |
| 2014/0295822 | A1* | 10/2014 | Koo .................. G06Q 20/3278 |
| | | | 455/420 |
| 2014/0314921 | A1* | 10/2014 | Kuempel ............... H04L 67/10 |
| | | | 426/231 |
| 2015/0305551 | A1* | 10/2015 | Rosati ....................... A23F 3/18 |
| | | | 426/231 |
| 2016/0019559 | A1* | 1/2016 | Borack .............. G06Q 30/0201 |
| | | | 705/7.29 |

\* cited by examiner

SYSTEM AND METHOD TO OBTAIN AND OPTIMIZE MIXTURES FOR PREPARING BEVERAGES

CROSS-REFERENCE TO RELATED APPLICATIONS

This application claims priority to and any other benefit of Italian Application Serial No. UD2014A000146, filed on Aug. 22, 2014, the contents of which is incorporated by reference herein in its entirety.

FIELD OF THE INVENTION

The present invention in general, concerns a system and method to optimize and obtain a beverage and, in particular, concerns a system and method to prepare a personalized formula of a mixture or blend by means of dedicated computer program code, wherein the mixture or blend is used to obtain the beverage.

Hereafter, merely by way of example, we will mainly describe the case of coffee mixtures or blends, but within the spirit of the invention, the description is also applicable in the case of tea, cocoa, drinking chocolate, milk or other substances, alone or to be integrated with each other or with the coffee or tea, and/or with other substances depending on the function to which the beverage is destined, due to the specific requirements of a specific, identifiable person.

BACKGROUND OF THE INVENTION

It is known that connoisseurs of coffee or tea want to obtain mixtures or blends that produce a beverage able to satisfy their personal taste and sensory profile. It is also known that there are connoisseurs of sport drinks and energy drinks, infusions of various types, and that said connoisseurs want to obtain drinks which meet their specific requirements. It is also known that there are medical substances that constitute compositions of various products and that are intended for specific functions of the body, since said functions are uniform, without taking into account the requirements of the specific patient.

Therefore, the inventive idea creates the possibility for a specific user, depending on the specific equipment of the device according to the invention, to define the mixture or blend that exactly meets his/her requirements, whether they are for the senses, for sport, energizing, tranquillizing or sanitizing or functional for his/her body.

Currently, however, it is possible to obtain beverages with predefined mixtures, or beverages with do-it-yourself mixtures.

In the first case, beverages obtained with predefined mixtures (such as coffee, tea, sports drinks, energy drinks or those intended for specific functions for the body and already on the market) cannot satisfy the sensory, physical or physiological requirements, or the requirements of performance or the purposes of the user, inasmuch as they express a mean value which is in any case predefined.

In the second case, that is, do-it-yourself, the mixture obtained and hence the resulting beverage, can contain ratios of the components in size and quantity that are not favorable, or not compatible for the correct management of that specific body. Furthermore, do-it-yourself mixtures or predefined mixtures can include components that are not suitable or not compatible with each other and/or for that specific body and/or for that function.

There is therefore a need to obtain a personalized formula to obtain and optimize mixtures or blends able to generate personalized beverages and a connected method, which can overcome at least one of the disadvantages of the state of the art.

In particular, the purpose of the invention is to obtain a device, management and control means and connected personalized computer program code, all targeted, according to the constitutive and organizational structure, for one and/or other type of beverage, in any case personalized, both for the specific user and also the specific function for the specific user. While the inventive idea allows do-it-yourself compositions based on sensory requirements or aromatic profile, or sporting and/or energizing and/or functional purposes, taking into account the characteristics specified by the user, it also avoids creating mixtures or blends in which there are unbalanced and/or unsuitable and/or incompatible components in relation to the function it has to perform and coherent with the requirements of the specific person.

The whole is managed by computer program code able to generate personalized formulas depending on the specific functions that the beverage to be obtained must perform in the specific individual.

The applicant has devised, tested and embodied the present invention to overcome the shortcomings of the state of the art and to obtain these and other purposes and advantages.

SUMMARY OF THE INVENTION

The invention provides a dedicated computer program code which is executed by a computing unit of a user terminal to allow a specific user to personalize a formula by defining composition of various substances of a mixture or blend for preparation of a beverage. According to an embodiment of the invention, the computer program code is configured to communicate the personalized formula to a remote device. The remote device comprises a control and management unit which is configured to receive the personalized formula and carry out the functions of a plurality of units of the remote device to obtain the mixture or blend and the beverage. The mixture or blend is obtained according to the personalized formula by the plurality of devices which may include one or more or all of devices of a group comprising: at least a selector device, at least a measuring device, at least a mixer/blender device, at least a grinding device, at least a dispenser device, and at least a control and management device. For instance, the measuring device and the mixer/blender device can be the same device, or can be two different devices.

According to an embodiment of the invention, the personalized formula is able to be generated using a computer program code present directly on the remote device.

The invention provides a dedicated computer program code which is executed by a computing unit of a user terminal to allow a specific user to define various characteristics of the beverage to be obtained. The characteristics include at least a sensory requirement, a taste requirement, a purpose of the beverage, an origin profile, etc.

According to an embodiment of the invention, the dedicated computer program code is configured to perform diagnostics of the generated personalized formula. The diagnostics may include identifying any errors present in the generated personalized formula. The errors may include at least one of, ratios of the components in size and quantity that are not favorable, unavailability of any component, presence of any component that is not suitable for the purpose of the beverage defined by the user, presence of components which are not compatible with each other, or excessive or limited quantity of components. The computer program code may also be configured to generate at least a warning or an alarm when an error is identified.

The invention provides a non-transitory computer readable medium including at least computer program code for generating personalized formulas of mixtures or blends and obtaining a beverage prepared according to said personalized formula, said computer readable medium comprising: computer program code for providing an interface to receive a plurality of inputs from a user, wherein said plurality of inputs is intended to define at least a plurality of characteristics of the components of a mixture or blend to be obtained; computer program code for generating a personalized formula for the mixture or blend to be obtained, wherein the personalized formula is generated on the basis of said plurality of inputs provided by the user; computer program code for communicating the generated personalized formula of mixtures or blends to a remote device, wherein the remote device is configured to prepare at least the mixture or blend and the beverage according to the personalized formula of mixtures or blends.

The invention provides a user terminal, comprising: a computing device configured to execute computer program code for generating personalized formulas of mixtures or blends and for obtaining a beverage prepared according to said personalized formula; and a data storage device configured to store computer program code that is able to be executed by the computing device. The computer program code stored in the data storage device including at least: computer program code for providing an interface to receive a plurality of inputs from a user of the user terminal, wherein said plurality of inputs is intended to define at least a plurality of characteristics of the components of a mixture or blend to be obtained; computer program code for generating a personalized formula for the mixture or blend to be obtained, wherein the personalized formula is generated on the basis of said plurality of inputs provided by the user; and computer program code for communicating the generated personalized formula of mixtures or blends to a remote device, wherein the remote device is configured to prepare at least the mixture or blend and the beverage according to the personalized formula of mixtures or blends.

The invention provides a system for optimizing and preparing a beverage according to a personalized formula of mixtures or blends, said system comprising: a data storage means storing computer program code that is able to be executed by a computing device, the computer program code is configured to provide an interface to a user to provide a plurality of inputs, wherein the provided inputs are used by the computer code to at least generate the personalized formula of mixtures or blends; a transceiver means configured with the data storage means to transmit the personalized formula; a remote device configured for receiving the personalized formula of mixtures or blends and preparing the beverage according to the received personalized formula. According to an embodiment of the invention, the remote device further comprises at least: a selector unit comprising a plurality of containers of basic substances and a selection means configured to select at least one substance according to the received personalized formula; a measuring unit configured to measure the quantity of the selected substances according to the received personalized formula, wherein the measuring unit is further configured to mix the substances in a container; a grinding unit configured to grind the mixed substances according to the received personalized formula; a beverage preparing unit for preparing the beverage according to the received personalized formula; and a management and control means configured to carry out functions of all the units of the remote device according to the received personalized formula.

The invention provides a method for generating personalized formula of mixtures or blends and obtaining a beverage, the method comprising: providing, by a user, a plurality of inputs into a computer program code, wherein said plurality of inputs is intended to define at least a plurality of characteristics of components of the mixture or blend to be obtained; generating, by the computer program code, a personalized formula for the mixture or blend to be obtained, wherein the personalized formula is generated on the basis of said plurality of inputs provided by the user; communicating, by the computer program, the generated personalized formula of mixtures or blends to a remote device, wherein the remote device is configured to prepare at least the mixture or blend and the beverage according to the personalized formula of mixtures or blends.

The invention provides a method for storing a plurality of personalized preferences on a server, the method comprising: receiving at the server, the plurality of personalized preferences from a plurality of user terminals; storing the received plurality of personalized preferences in a database; clustering the plurality of personalized preferences according to a plurality of parameters. According to an embodiment of the invention, the parameters may be such as but not limited to a sensory profile, a purpose of a beverage, an origin profile, a type of blend, a territory, a geographic origin or area, a type of serving. According to an embodiment, stored clustered personalized preferences can be referred, or correlated, to other data for data analysis activities, including statistic analyses and/or big data analytics.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some forms of embodiment, given as a non-restrictive example with reference to the attached drawings wherein.

DETAILED DESCRIPTION OF SOME FORMS OF EMBODIMENT

We shall now refer in detail to the various forms of embodiment of the present invention, of which one or more examples are shown in the attached drawings. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

The formula refers to a description of characteristics of various substances to be included in a mixture or blend to obtain a recipe for the preparation of a beverage. Furthermore, according to embodiments, which can be combinable with all embodiments described herein, a user as disclosed in association with the embodiments described herein can be selected from a group comprising: a barista, an operator, a professional operator, a consumer, a end-user, a domestic user, a tester user, a end-client, a coffee bar client. For instance, according to possible implementations, a user as mentioned in association with the embodiments described herein can be a barista.

Figure 1:
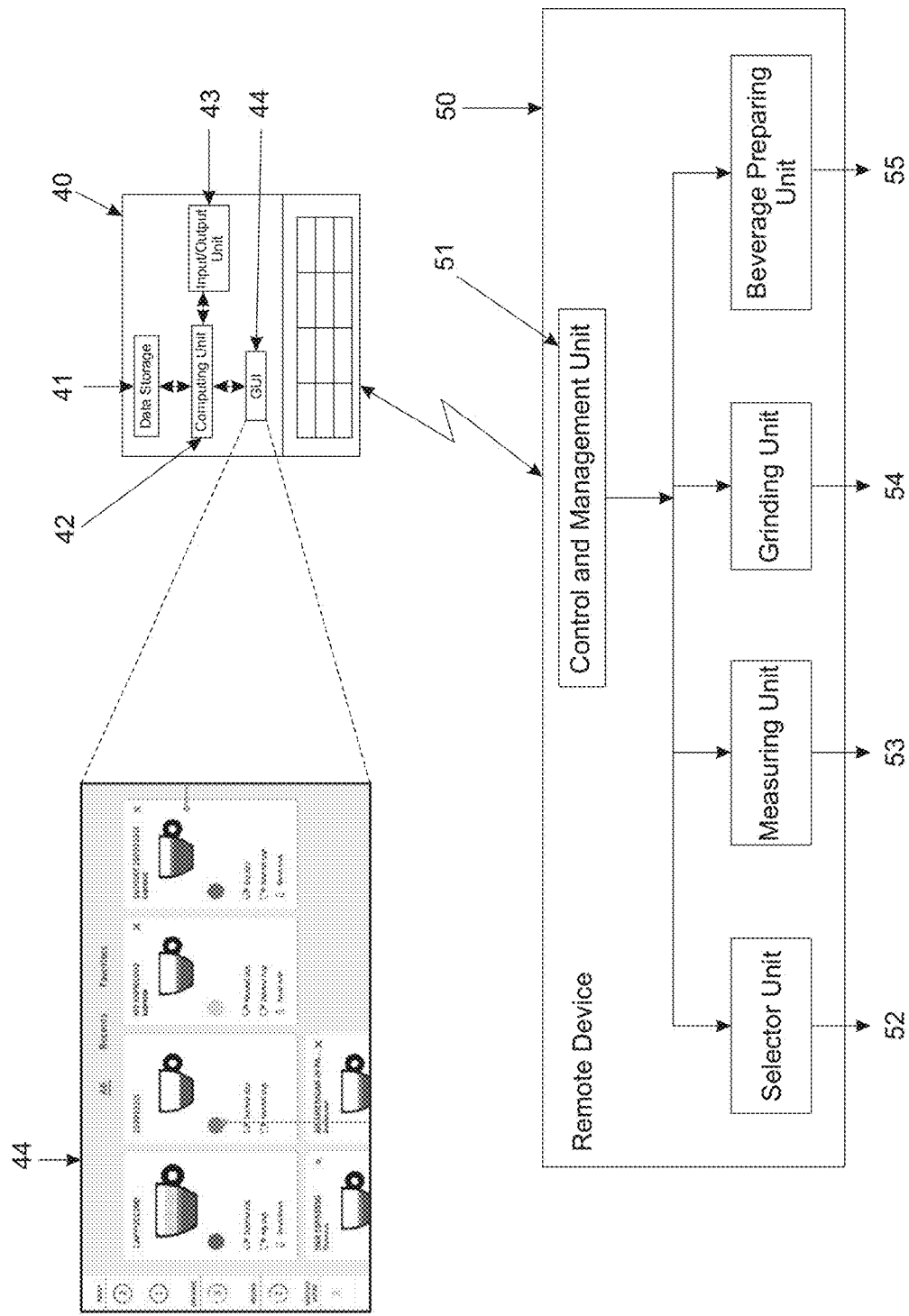
FIG. 1 schematically shows a possible functioning of the invention.

FIG. 1 shows the functioning of the invention according to an embodiment of the invention. A user terminal 40 includes a data storage unit, or data storage means, or data storage device, 41, a computing unit, or computing device, 42, an input/output unit 43, and an interface, or GUI (Graphical User Interface) 44. The user terminal can be such as but not limited to mobile phone, palmtop computer, PDA (Personal Digital Assistant), laptop, notebook, netbook, ultrabook, PC (Personal Computer), tablet, smartphone, phablet etc. A computer program code operable to perform the functioning of the invention is stored in the data storage 41 and is able to be executed by the computing unit 42. The computer program code when executed by the computing unit 42, provides the graphical user interface 44 to a user of the user terminal 40. The user can provide inputs into the graphical user interface 44 (described in greater detail with reference to FIG. 2-14) with the help of the input/output unit 43 and input/output means (not shown). The input/output means can be such as but not limited to buttons, physical buttons, virtual buttons, keyboard, mouse, electronic pen, touch screen, voice command devices, optoelectronic input devices, gesture or movement recognition devices or other similar or comparable input means. The interface 44 shown in FIG. 1 is just for exemplary purposes and various modifications in the interfaces can be done to serve similar purposes and all such modifications come within the spirit and scope of the invention. According to one such modification, the interface can be designed as a question/answer form displayed to the user. The question/answer form can be used to carry out the dialog and interchange of information between the user and the computer program code. Transceiver means can also be provided, which is configured with the data storage unit 41 to transmit the personalized formula.

The inputs which can be provided by the user may be intended to describe various characteristics of a plurality of mechanical elements, components and the like of the system according to the invention. Furthermore, the inputs provided by the user are intended to describe various characteristics or parameters of the environment where the system of the invention has to be set or installed, e.g. humidity, pressure, temperature, number of people present in the environment, etc. . . . , or characteristics of the substance, for instance age of the coffee grains/beans or moisture content of the coffee grains/beans. Such inputs can be for instance used in the pre-setting of the system of the invention. The inputs provided by the user may be further intended to describe various characteristics of a plurality of components of a mixture or blend to be obtained. The characteristics may be such as but not limited to quantity of substances, extent of grinding (e.g. powder granulometry), temperature, water and/or steam temperature, pressure, extraction pressure, water and/or steam pressure, quantity of water and/or steam, final volume of the beverage, working time, extraction time and number of doses of the mixture or blend. The user inputs may further be intended to obtain different types of beverages, for example in terms of volume/amount of beverages. For instance, in the case of coffee, the user inputs may be directed to select an espresso coffee, a double espresso coffee, a short espresso coffee, a long espresso coffee, an American coffee or, in general, a amount or volume of beverage the user desires to be dispensed in the cup, for instance normal size, normal cup, big size, big cup. Again, for instance in the case of coffee, the user inputs may be directed to select a desired degree of crema or foaminess of the beverage. For example, adjusting crema or foaminess may be obtained by adjusting extraction pressure, in particular hydraulic and/or pneumatic pressure. Special, personalized and/or optimized pre-settings may be stored according to the invention, correlating the above characteristics with the different types of beverages. Again, the user inputs may further be intended to optimize and obtain a beverage prepared according to the mixture obtained. The user can also describe various preferences for the beverage he wants to obtain. For example, the user can define a sensory profile, an origin profile, a purpose of the beverage, etc. The sensory profile refers to taste of the beverage to be obtained such as but not limited to fruity, bitter, sweet, chocolaty, flowery, etc. The origin profile refers to base recipe of the beverage to be obtained such as but not limited to brazil, ethiopia, costa rica, etc. The origin profile determines various substances to be used to obtain a mixture for the preparation of the beverage. The purpose of the beverage may refer to the functions that the user wants the beverage to perform in his/her body. The user may want a beverage to serve the purposes such as but not limited to an energizing drink, a relaxation drink, as supplements, tranquillizing drink, etc. The above inputs provided by the user can be combined or correlated each other, according to the needs.

The computer program code is configured to generate a personalized formula of mixtures to be used in preparation of a beverage according to the inputs received from the user. The formula refers to a description of characteristics of various substances to be included in the mixture to obtain the beverage. The personalized formula also contains instructions regarding how to prepare the mixture and the beverage.

The computer program code is further configured to perform diagnostics of the generated personalized formula. The diagnostics may include identifying any errors present in the generated personalized formula. The errors may be such as but not limited to, ratios of the components in size and quantity that are not favorable, unavailability of any substance, presence of any component that is not suitable for the purpose of the beverage as defined by the user, presence of components which are not compatible with each other, or excessive or limited quantity of components. The computer program code is also configured to generate at least a warning or an alarm when an error is identified. Also the computer program code is configured to advise the user that the formula has errors. At the same time, the computer program code can provide suggestions to the user by indicating similar compositions to serve similar purposes as intended by the user.

The formula once generated is communicated to a remote device 50 for preparation of the mixture and the beverage to be obtained. The remote device 50 is a beverage preparing device such as a coffee dispensing machine, a beer dispensing machine, a tea maker, a soup preparation device, or any other similar device known to an ordinary skilled in the art. The formula can be communicated to the remote device with the help of a telematics connection i.e. any of the wired or wireless connection can be used.

According to embodiments, the remote device 50 can comprise a control and management unit 51, a selector unit 52, a measuring unit 53, a grinding unit 54, and a beverage preparing unit 55. The control and management unit 51 can be configured to receive the formula from the user terminal 40 and carry out the functioning of various units 52-55 of the remote device 50. The control and management unit 51 carry out the instructions of the received formula and operate the units 52-55 of the remote device 50 to obtain the mixture and the beverage according to the personalized formula. In possible implementations, the remote device 50 can comprise for instance a plurality of selector units 42 and/or a plurality of measuring units 53, and/or a plurality of grinding unit 54, and/or a plurality of beverage preparing units 55.

The selector unit 52 may be provided with a plurality of containers configured to contain a plurality of substances to be used as a composition to obtain the mixture. In other words, the plurality of containers of the selector unit 52 can be the source(s) of the different substances that can be used for preparing the beverage according to the personalized formula. The control and management unit 51 provides the instructions to the selector unit 52 to select and dispense various substances according to the personalized formula. The various substances are selected from the above mentioned containers of the selector unit 52. The containers can be two, three, four, five, six, seven, eight, nine, ten or more than ten containers. For instance, the containers can be nine, each containing a different type of substance.

The measuring unit 53 can be configured to measure the quantity of the substances provided by the selector unit 52 according to the personalized formula. The measuring unit 53 may be able to measure the quantity of the substances in units of volume, mass, weight, or any other units known to an ordinary skilled in the art. The measuring unit 53 may be able to directly or indirectly measure the quantity of substances. For instance, a direct measure can be measuring the weight of substances, while an indirect measure can be measuring a proportioning or dosing time and correlating the proportioning or dosing time with a known amount of substance proportioned or dosed per time unit. Therefore, the measuring unit can be a measuring and/or proportioning and/or dosing unit. Furthermore, the measuring unit 53 can be configured also to perform mixing/blending of the substances provided by the selector unit 52, i.e. the measuring unit 53 can be also a mixing/blender unit. In possible embodiments, combinable with all embodiments described herein, the selector unit 52 and the measuring unit 53 can be integrated in one apparatus including a separator proportioner unit configured to measure out the quantity of substance (e.g. coffee grains/beans) in individual measures, an incremental weighing unit, configured to weigh a quantity of substances proportioned by the separator proportioner unit, an electronic control card configured to receive a signal of weight from the incremental weighing unit and to calculate the weight of the proportioned substances. In possible implementations, the separator proportioner unit may comprise a feed device configured to feed the substances (e.g. coffee grains/beans) loosely and a separator transfer member configured to guide the substances received from the feed device in single file and a vibrator unit configured to make the separator transfer member vibrate in order to determine the feed of the substances in single file. In possible implementations, the above incremental weighing unit may comprise a container, or common container, to receive the substances (e.g. coffee grains/beans) transferred by the separator proportioner unit and a sensor unit configured to detect the weight force acting on the container. An example of sensor unit is a load cell. The control and management unit 51 provides the instructions to the measuring unit 53 to measure the quantities of the substances according to the personalized formula. In possible implementations, the control and management unit 51 may communicate with the above electronic control card in order to control the measured quantity of substances with respect to the personalized formula. In possible implementations, the control and management unit 51 and the above electronic control card may coincide. The measuring unit 53 performs the measuring operation, for instance essentially one by one in the case of grains/beans, especially coffee grains/beans, of the substances (such as coffee beans) dispensed by the plurality of containers of the selector unit 52, for example into the above mentioned common container and, dispensing the selected substances (e.g. coffee grains/beans) in the common container, also causes mixing of the different types of substances in such common container. For instance, the substances, once mixed into the common container, and prior to be subjected to grinding, can be measured, e.g. can be weighed or subjected to other direct or indirect quantity/amount measurement. Then the mix of substances, precisely measured according to the personalized formula, can be provided to the grinding unit 54, for instance by "pouring" the content of the common container into the grinding unit 54. In other implementations, the mix of substances, instead of being ground/crushed, can be packed and provided to the user.

The grinding unit 54 is configured to grind/crush the substances provided by the selector unit 52 and measured by the measuring unit 53. In possible embodiments, combinable with all embodiments described herein, the grinding unit 54 can include a pair of grinders coaxial with respect to a common central axis and an automatic adjustment unit configured to adjust a reciprocal distance between the grinders. In possible implementations, the automatic adjustment unit can include an adjustment body connected to a grinder and mobile, so as to allow the positioning of such grinder with respect to the other grinder, for the adjustment. In possible embodiments, combinable with all embodiments described herein, the grinding unit 54 can include at least one air-powered powder removal member configured to remove ground substance powder from the grinding unit at the end of the grinding operation. This could be advantageous in order to eliminate cross-contamination between powder mixtures, that potentially could be made according to different personalized formulas, that are produced in sequence in the grinding unit 54, so that beverages made according to the present invention are not influenced by other beverages previously prepared in the same system. In possible implementations, the air-powered powder removal member can include a pneumatic powder removal member (e.g. a pneumatic member for blowing compressed air) or an air suction member. The control and management unit 51 provides the instructions to the grinding unit 54 to grind the substances according to the personalized formula. Instructions provided by the control and management unit 51 to the grinding unit 54 can also include instructions for adjusting on each occasion granulometry/powder size of the powder generated by grinding/crushing the substances in the grinding unit 54, according to the specific personalized formula. Such instructions can be for instance used by the above automatic adjustment unit of the grinding unit 54. Instructions provided by the control and management unit 51 to the grinding unit 54 can further include instructions for operating the above air-powered powder removal member, typically at the end of the grinding operation. Removed powder can be, for instance, recovered in the final mixture. After grinding the substances, the mixture is obtained in accordance with all the instructions of the personalized formula. Such mixture is, thus, ready to be provided to the beverage preparing unit 55.

The beverage preparing unit 55 is configured to treat the mixture to obtain the beverage intended to be obtained by the user. The control and management unit 51 provides the instructions to the beverage preparing unit 55 to treat the mixture according to the personalized formula to obtain the beverage. In possible embodiments, combinable with all embodiments described herein, the beverage preparing unit 55 may include, or be associated to, a pressing device to press the ground substances, i.e. the ground powder, for instance a pressing device, also known as "tamper", for pressing the coffee powder.

The remote device 50 as shown in FIG. 1 is just for exemplary purposes and various modifications in the remote device 50 can be done to serve similar purposes and all such modifications come within the spirit and scope of the invention. According to one such modification, the units 51-55 of the remote device 50 can be implemented as separate devices rather than a complete device as shown in FIG. 1. The units 51-55 of the remote device as shown in FIG. 1 are also just for exemplary purpose and the remote device may or may not contain any of the units explained herein without departing from the spirit and scope of the invention.

According to an embodiment of the invention, the computer program code can be present within the control and management unit 51 of the remote device 50 and the interface 44 can be displayed to the user on the remote device 50. Further the computer program code can be also be stored on a third party server and can be accessed using the user terminal through internet.

According to an embodiment of the invention, the generated formula can be stored in the user terminal 40, or remote device 50, or both. The formula can, with user's consent, be placed on the web to be available to be viewed and/or used by other users.

According to an embodiment of the invention, the computer program code can be configured to virtually display all the processes taking place in the remote device via the interface 44 of the user terminal 40.

With reference to FIG. 2-14, the computer program code will now be described in greater detail as installed in a user terminal 60. The computer program code running on the user terminal 60 is operable by a user to create personalized formulas depending on the specific functions that the user wants the beverage to be obtained must perform. The formula is created using the computer program code installed in the user terminal and can be transmitted to a remote device via any known data transmission system by means of a telematics connection. For example, the formula can be transmitted by a wireless connection or a cabled connection.

FIG. 2-14 illustrates various interfaces of the user terminal 60 when the computer program code is executed on the user terminal.

Figure 2:
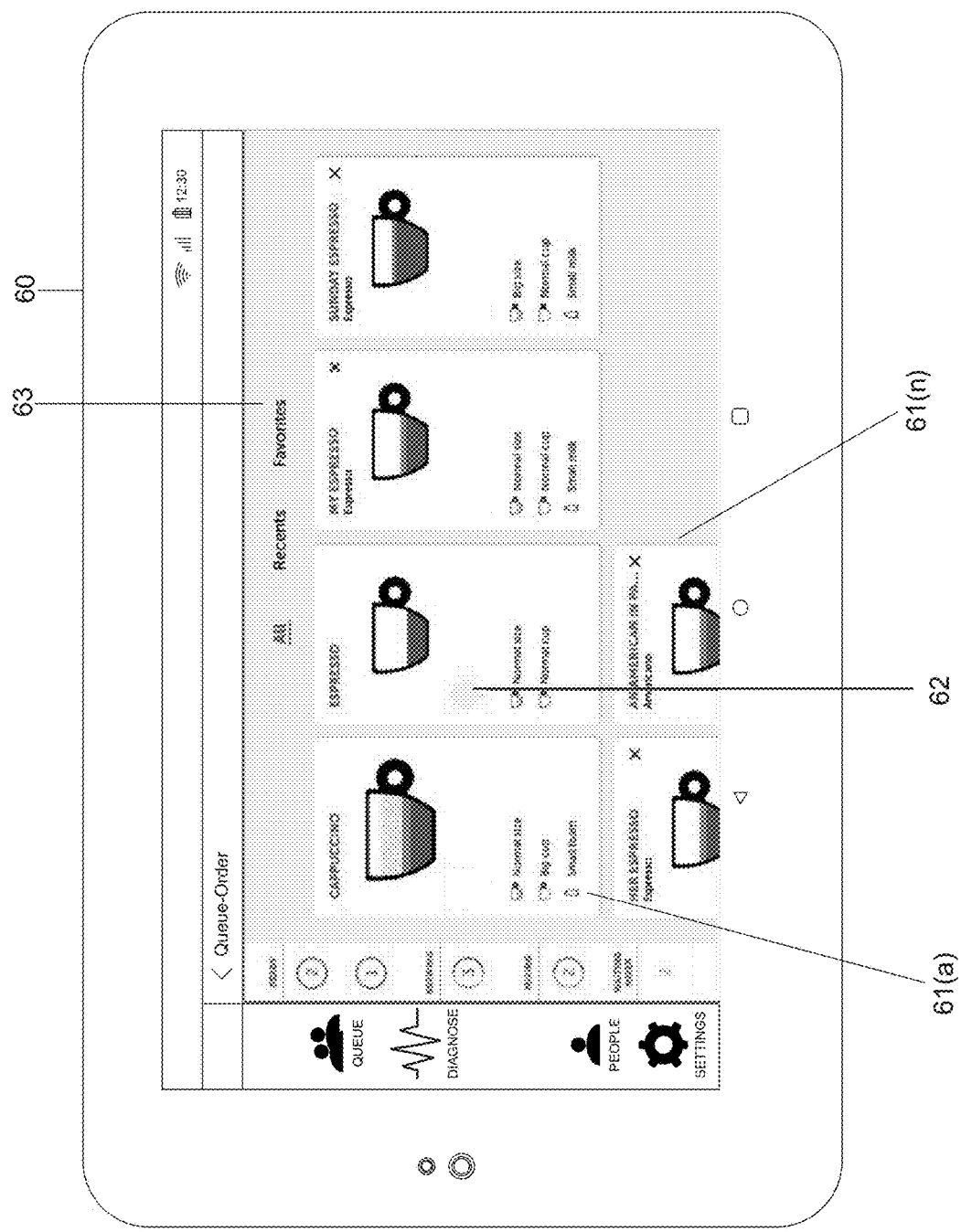
FIG. 2-14 illustrates various interfaces of the user terminal when the computer program code is executed on the user terminal.

FIG. 2 shows an interface when the computer program code is initiated to place an order for a beverage using the user terminal 60. The interface of the computer program code displays a recipe book, wherein the recipe book is a repository containing the official recipes already provided in the computer program code by a user, for example by the baristas, and/or the personalized recipes previously created and saved by the user. Each of the plurality of recipes (n) is presented inside cards 61(*a*)-61(*n*) which contains the name and basic information about characteristics of the beverage. The cards 61(*a*)-61(*n*) also display a colored round disc 62 which expresses a prevalent sensory component in the corresponding recipe. For example, the color of the disc 62 may represent whether the recipe is suitable for the senses, sports, energizing, tranquillizing or sanitizing purposes. The user can select any of the shown recipes to begin and customize the recipe as per the user requirements to create the personalized formula to define a composition of various substances to obtain a mixture to be used in preparation of the beverage he/she wants to order.

The interface also shows filters 63 (all, recent, favorites) for the user to display the recent recipes used by the user or only the recipes marked as favorites by the user. When the user selects a recipe, the detail of the recipe pops up and the user can modify and personalize the recipe according to his needs. Each recipe may be provided with further customization parameters, such as the volume of the beverage (e.g. normal size, big size) and/or of the cup (e.g. normal cup, big cup).

Figure 3:
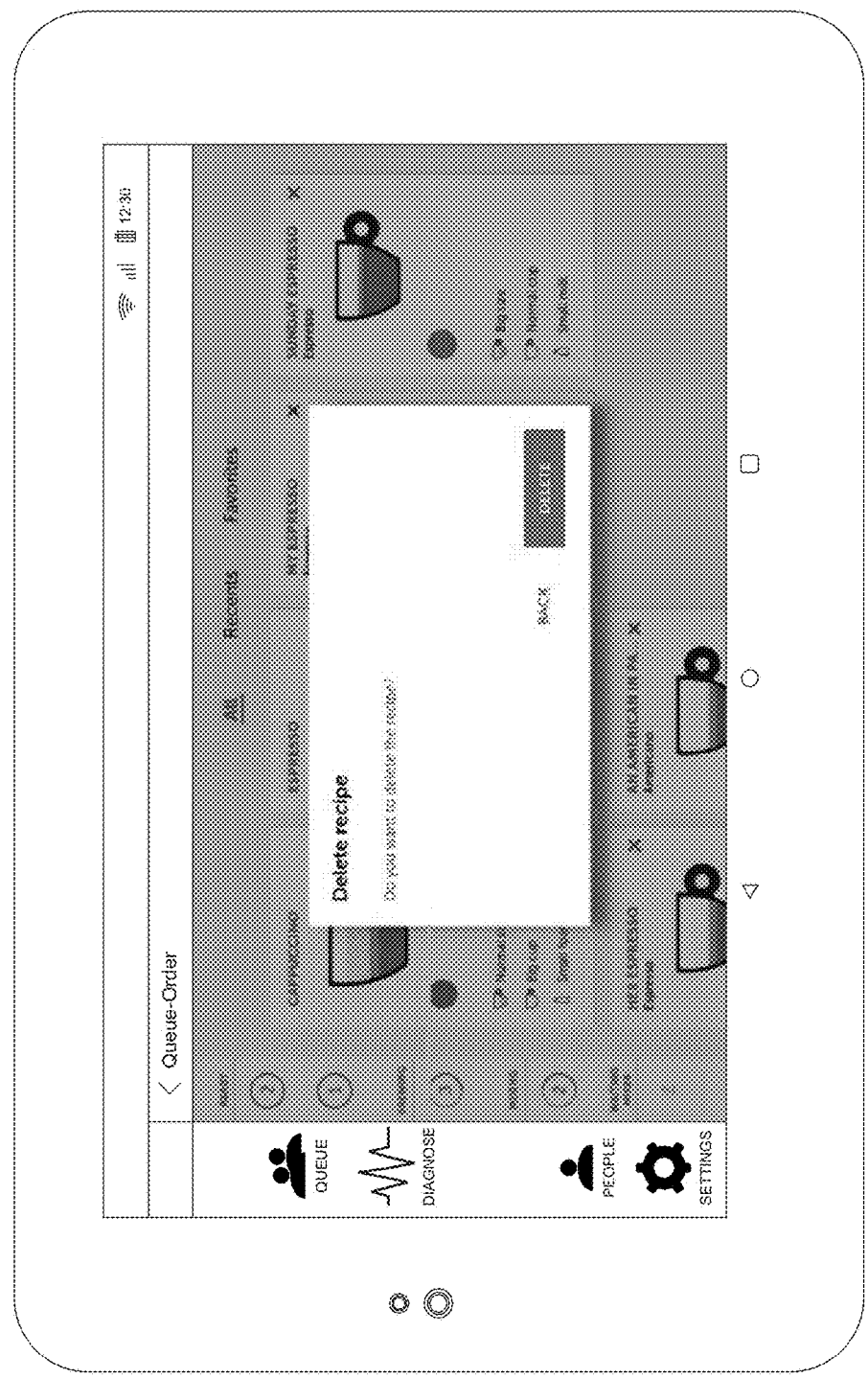

The user can also remove a personalized/saved recipe from the recipe book by clicking on the 'X' icon or button on the top corner of the card of the corresponding recipe as shown in FIG. 3.

Figure 4:
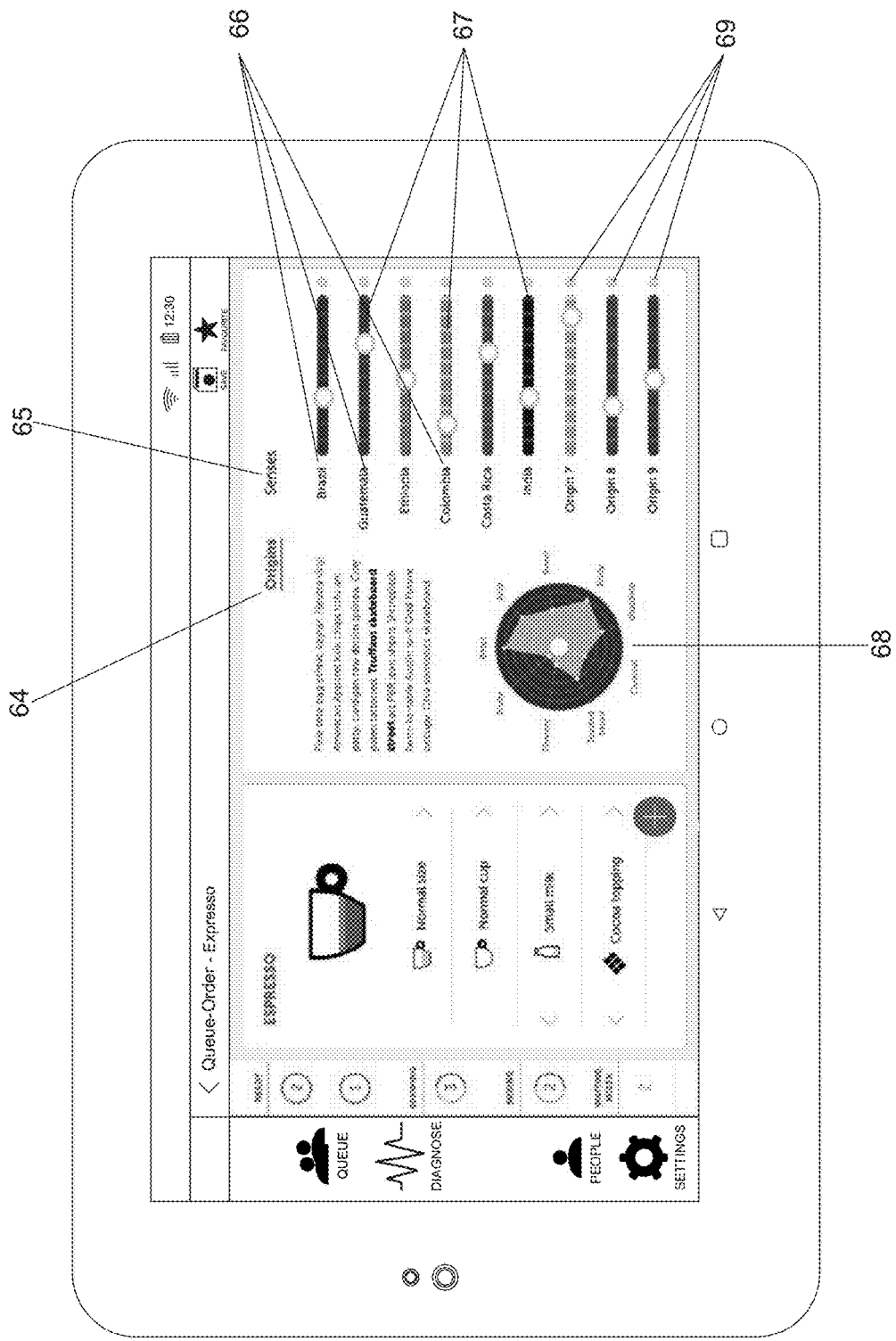
Figure 5:
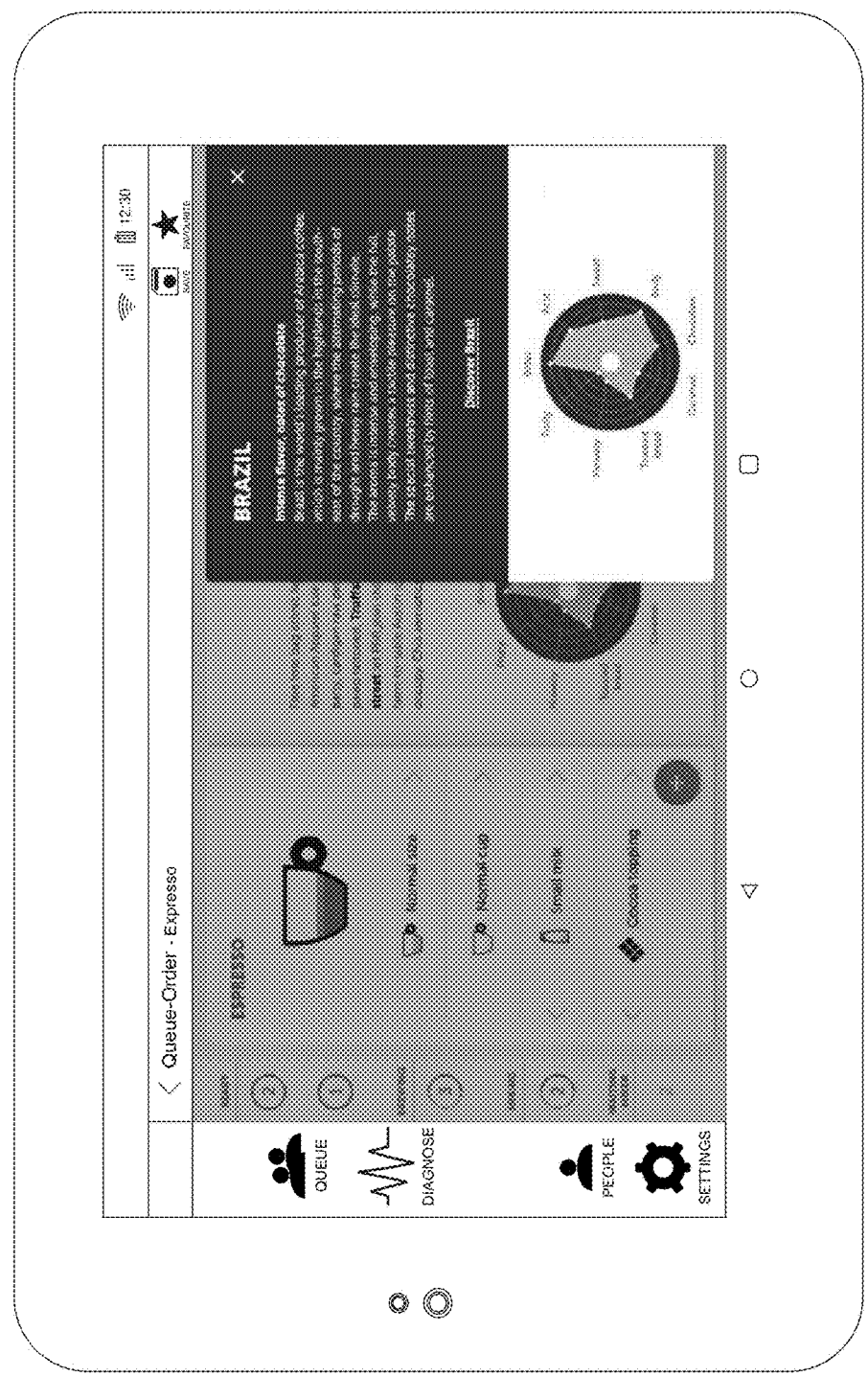

FIG. 4 shows an interface of the computer program code when the user has selected a recipe to modify and personalize. The interface shows a detail of the selected recipe which may include information such as but not limited to quantity, flavors, toppings, etc. The interface also provides options to modify and personalize the selected recipe by varying different components in the origin tab 64 or the senses tab 65 (as explained describing embodiments using FIG. 6). The user can prefer to personalize the recipe using the origin ingredients or sensory profile of the recipe. The origin tab 64, when selected, shows various components 66 of the origin of the beverage and the components can be varied using sliding cursors 67 for the corresponding origins. The interface also shows a radar graphic visualization, or radar graph, 68 depicting the organoleptic and sensory characteristics of the recipe. When the user customizes the components 66 of the origin, the changes are reflected in the radar graphic visualization 68 in terms of incidence of the sensory profiles. The radar graphic visualization 68 can be directly modified by the user by multi-touch gestures, such as finger pinch, pinch to stretch, pinch to zoom and the like. Modification thus provided to the radar graphic visualization 68 can directly modify or customize the components 66 of the origin. The user can click on an info button 69 next to each origin to obtain more detail about the particular origin to better understand the components of the corresponding origin and thus the personalization becomes more meaningful. An interface showing the details of the origin 'Brazil' is shown in FIG. 5.

Figure 6:
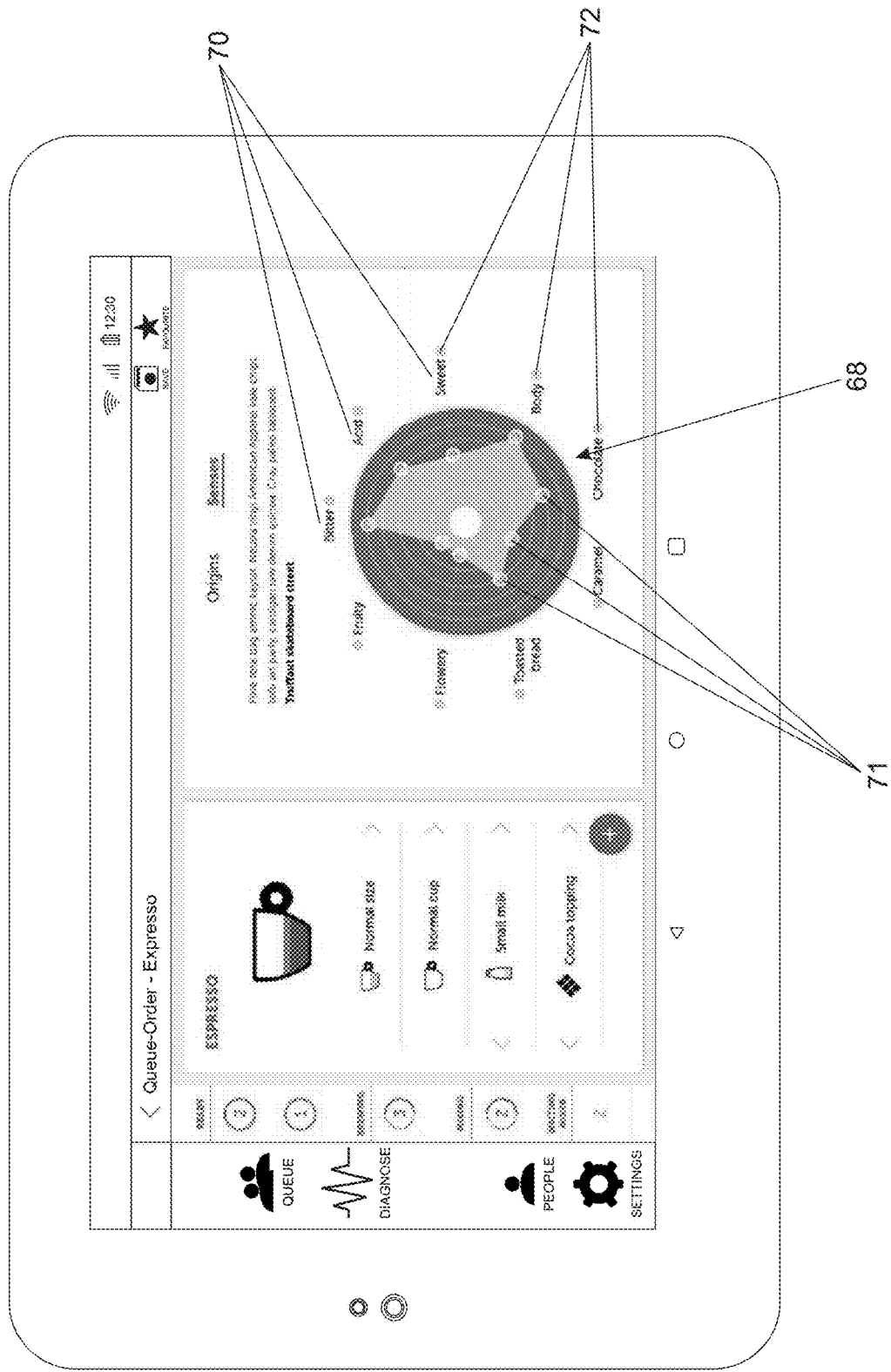

FIG. 6 shows an interface of the computer program code when the user has selected a recipe to modify and personalize using the sensory profile of the recipe. The interface shows the radar graphic visualization 68 depicting the organoleptic and sensory characteristics 70 of the recipe as also shown in the interface of FIG. 4. The graph depicts various sensory characteristics 70 of the recipe and the characteristics can be varied by moving the white discs 71 on the radar graph 68 corresponding to each characteristic 70. Once the recipe personalization is final, the recipe can be saved and sent for the preparation using the options provided on the interface of FIG. 4 or FIG. 6.

Figure 7:
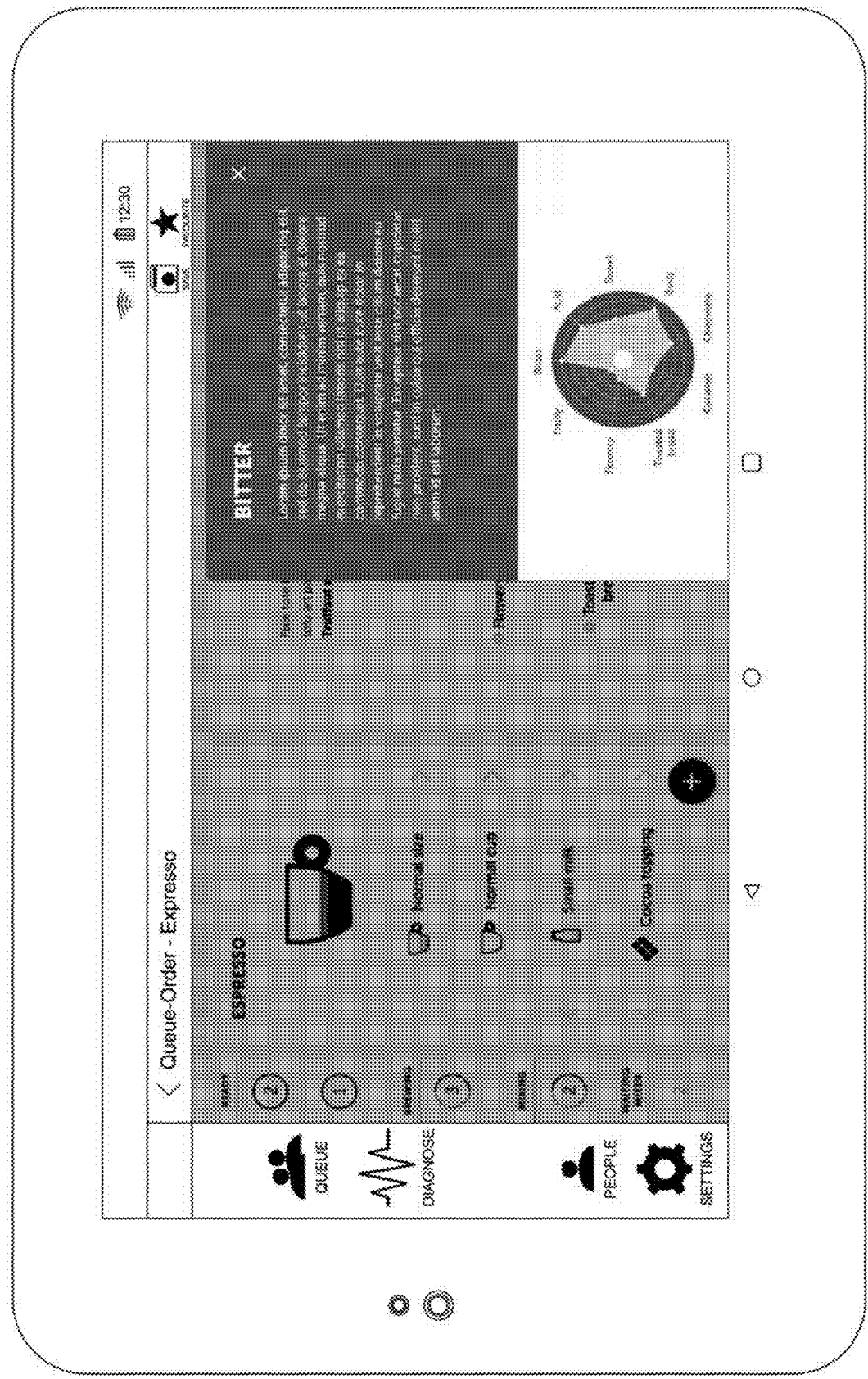

By clicking on an info button 72 next to each sensory profile, the user can obtain more detail about the particular sensory profile to better understand the characteristics of the sensory profile and thus the personalization becomes more meaningful. An interface of the computer program code showing the detail of the sensory profile 'Bitter' is shown in FIG. 7.

Apart from the options shown in the interfaces explained above, the user can also define other basic parameters associated with the personalized formula such as but not limited to degree of grinding, crushing or pulverization, temperature and/or pressure, for instance hydraulic and/or pneumatic pressure, for treating the mixture to obtain the beverage, quantity of water used for a dose, its temperature, pressure, final volume of the beverage, working time to obtain the beverage etc. The user can also indicate how many doses of the mixture are required on each occasion when the user orders the beverage. The user can also specify parameters of use or purpose that the user wants the beverage to perform for his/her body. For example, the user can specify that he/she wants the beverage to be suitable for the senses, sport, energizing, tranquillizing or sanitizing purposes.

It should be understood to an ordinary skilled in the art that the interfaces shown here are just for exemplary purposes and various modifications in the interfaces can be done to serve similar purposes and all such modifications come within the spirit and scope of the invention. According to one such modification, the interface can be designed as a question/answer form displayed to the user. The question/answer form can be used to carry out the dialog and interchange of information between the user and the computer program code. The interface may contain a set of questions targeted to obtain information associated to personalization of the formula. The purpose of the questions can be to examine the requirements, tastes and purposes of the user and the answers that he/she gives on each occasion are processed to obtain the formula.

The interface can be further modified to display all the steps performed while preparation of the mixture and/or the ordered beverage, as they are progressively performed.

Once the formula personalization is final, the user can save the formula within the user terminal or can share the personalized formula on the web to be able to be viewed and/or used by other users of the computer program code. The formula may be uploaded on the web and associated with parameters like sensory parameters, parameters of use, purpose or function of the beverage to be obtained by the formula.

Figure 8:
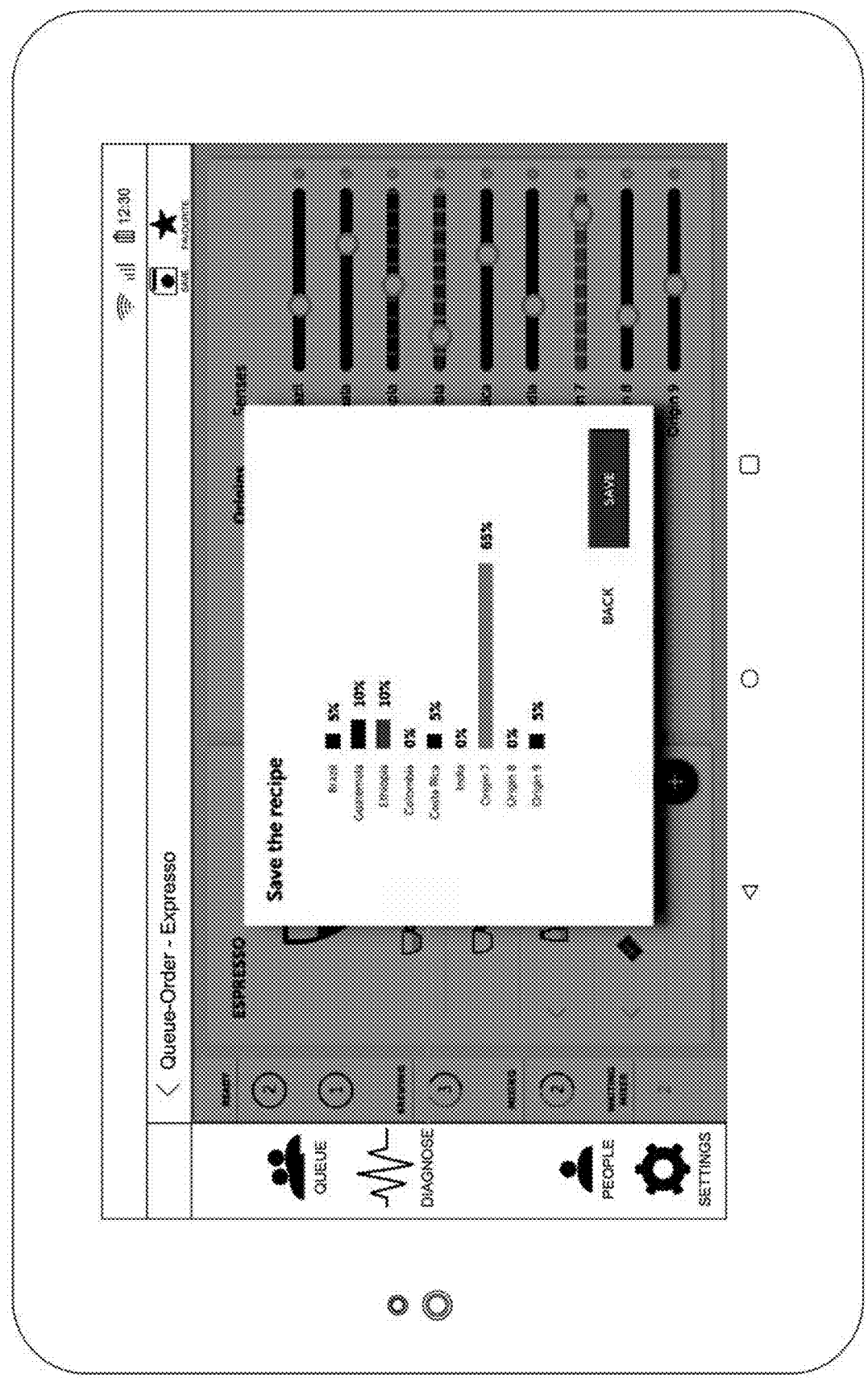

FIG. 8 shows an interface of the computer program code when the user opts to save the personalized recipe. The interface shows a popup with normalized values of the components of the origins as finalized by the user. The popup includes options using which the user can either go back to modify the recipe or finally save the recipe.

Figure 9:
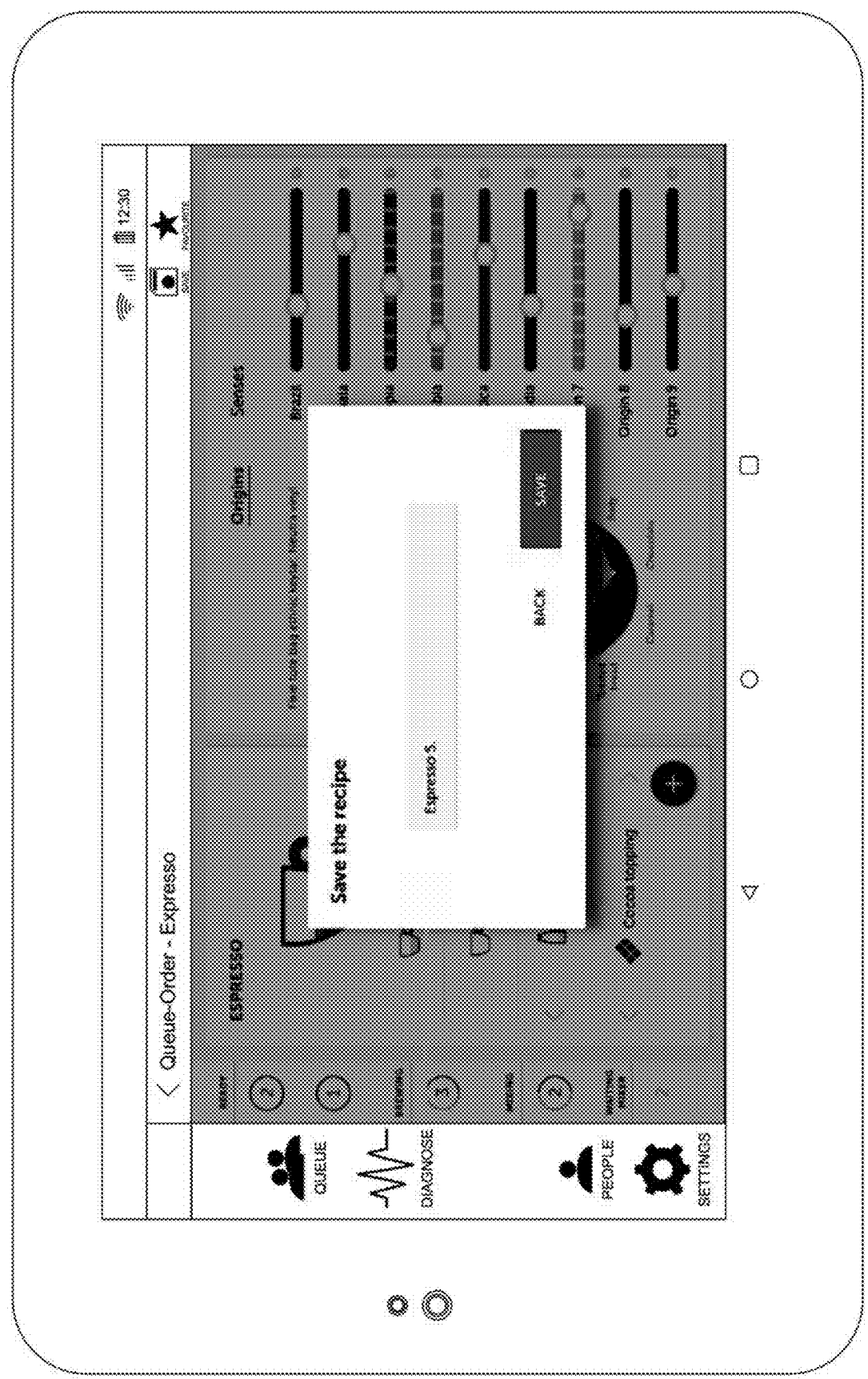

FIG. 9 shows an interface of the computer program code when the user clicks on "SAVE" button of the interface shown in FIG. 7. The interface shows a popup asking the user to enter a name for the personalized recipe to be stored in the repository containing all recipes. The name of the personalized recipe cannot be same as that of any official recipe stored in the repository. The recipe will be available to the user for further modifications in future.

A queue, or working queue, may be generated according to embodiments described herein. See for instance "QUEUE" menu in the left vertical band in the user interface of FIG. 2 to FIG. 14. The queue may for example be generated by the computing unit 42. The queue may include orders placed by one or more users for preparing the beverage, for instance orders which can be listed or arranged according to time priority and/or type of beverage and/or other parameters. Information regarding the queue can be accessed by the user for instance via the "QUEUE" menu, in order to control or monitor the orders placed by the user(s).

Figure 10:
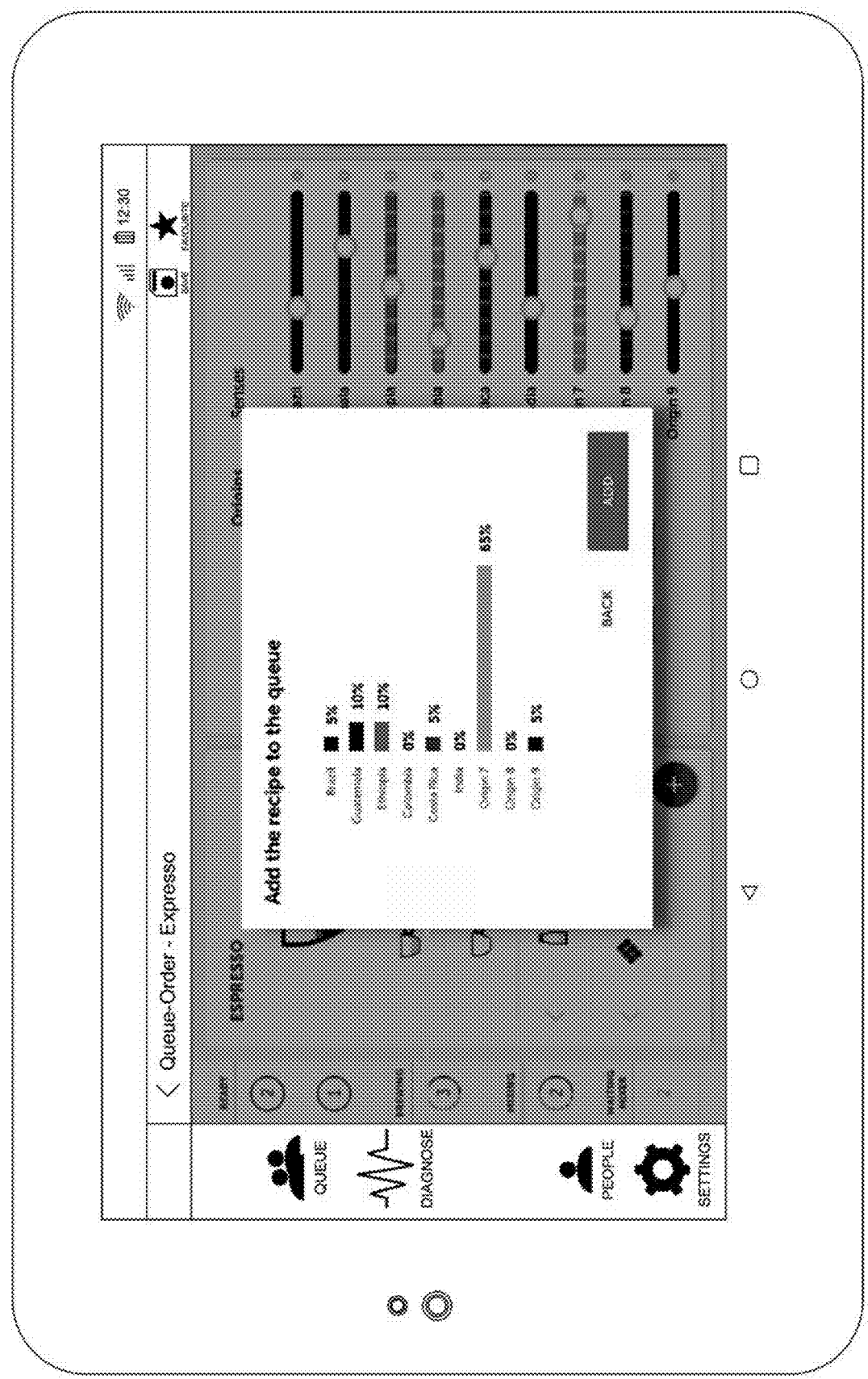

FIG. 10 shows an interface of the computer program code when the user opts to add the personalized recipe to the queue. The user can add the recipe to the queue by choosing the appropriate option from the interface shown in FIG. 4 or FIG. 6 and the recipe will be sent for the preparation by the dispensing machine. The data of the queue can also be used by the user to manage and/or control and/or optimize the status and/or priorities and/or number of the orders, also in respect of the availability of substances and/or availability of the beverage preparing units.

Figure 11:
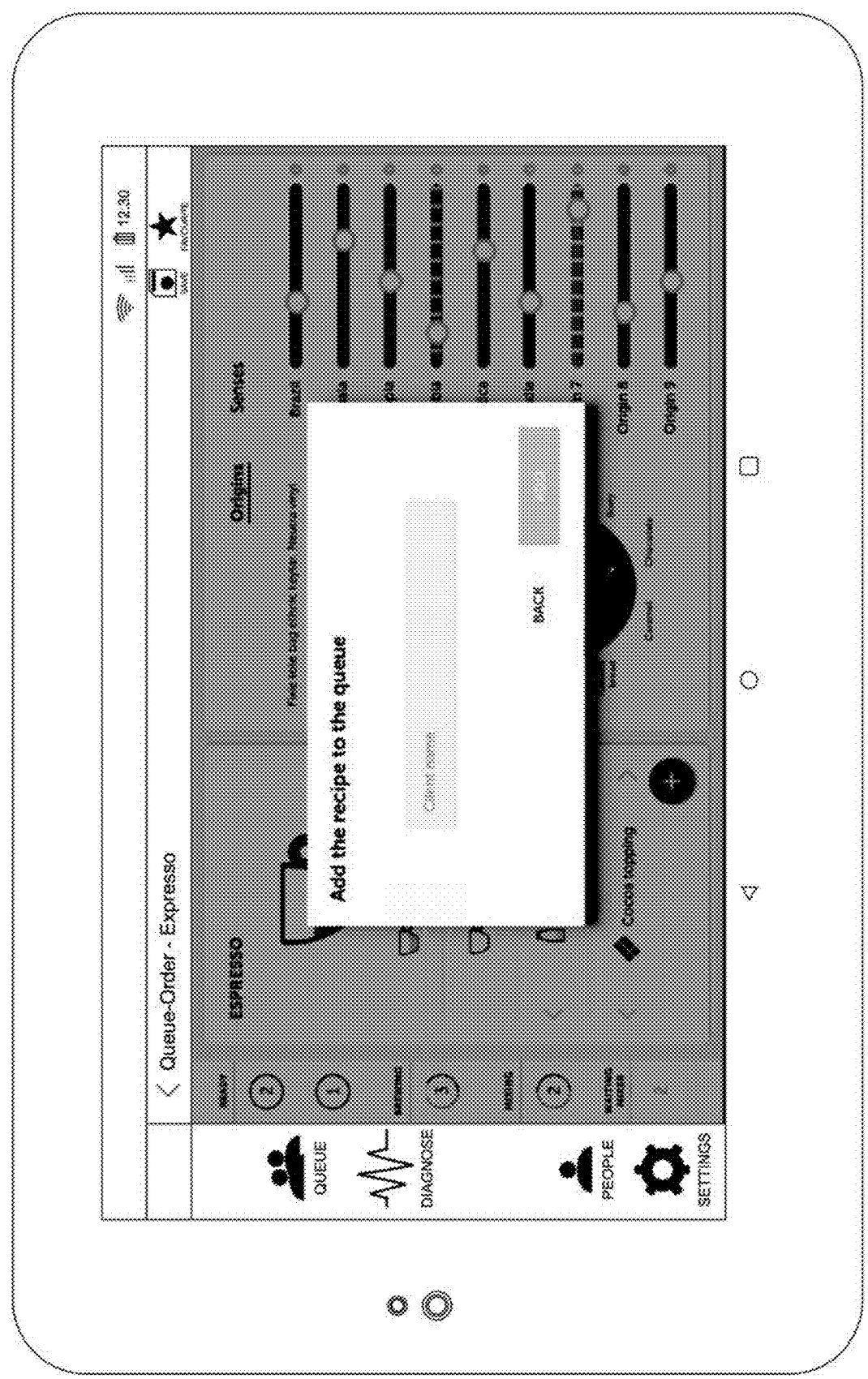

FIG. 11 shows an interface of the computer program code when the user clicks on "ADD" button of the interface shown in FIG. 10. The interface shows a popup asking the user to enter the user's name to be associated with the preparation of the recipe when the order is placed. For instance, the user's name can be a client's name.

Figure 12:
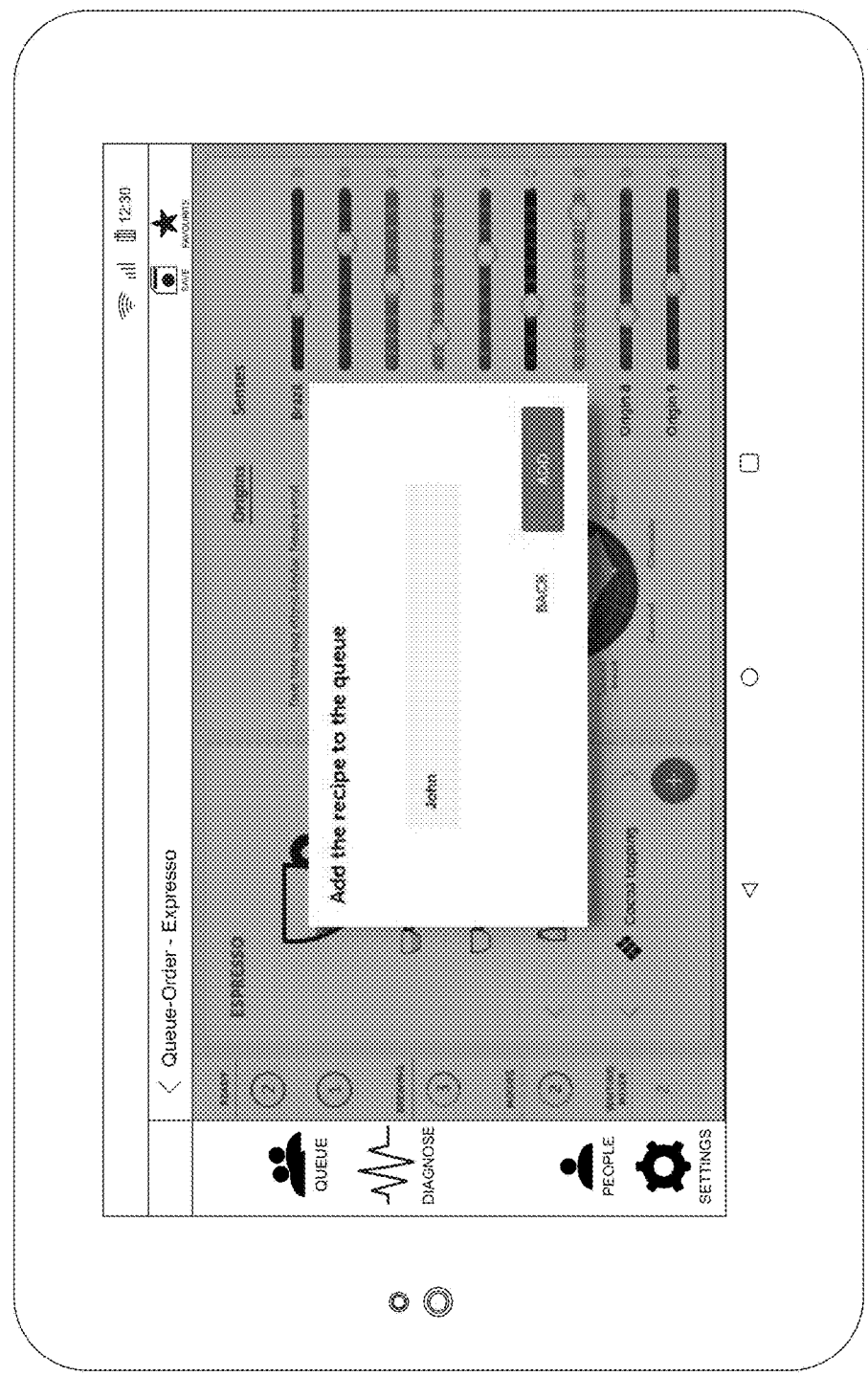

Once the user enters the name, the user can tap on "ADD" button to finalize the process as shown in FIG. 12. The "ADD" button becomes active only after the user has entered a name. The personalized formula is then communicated to the selector device where a mixture will be prepared according to the formula and the mixture will then be used to prepare the beverage.

Figure 13:
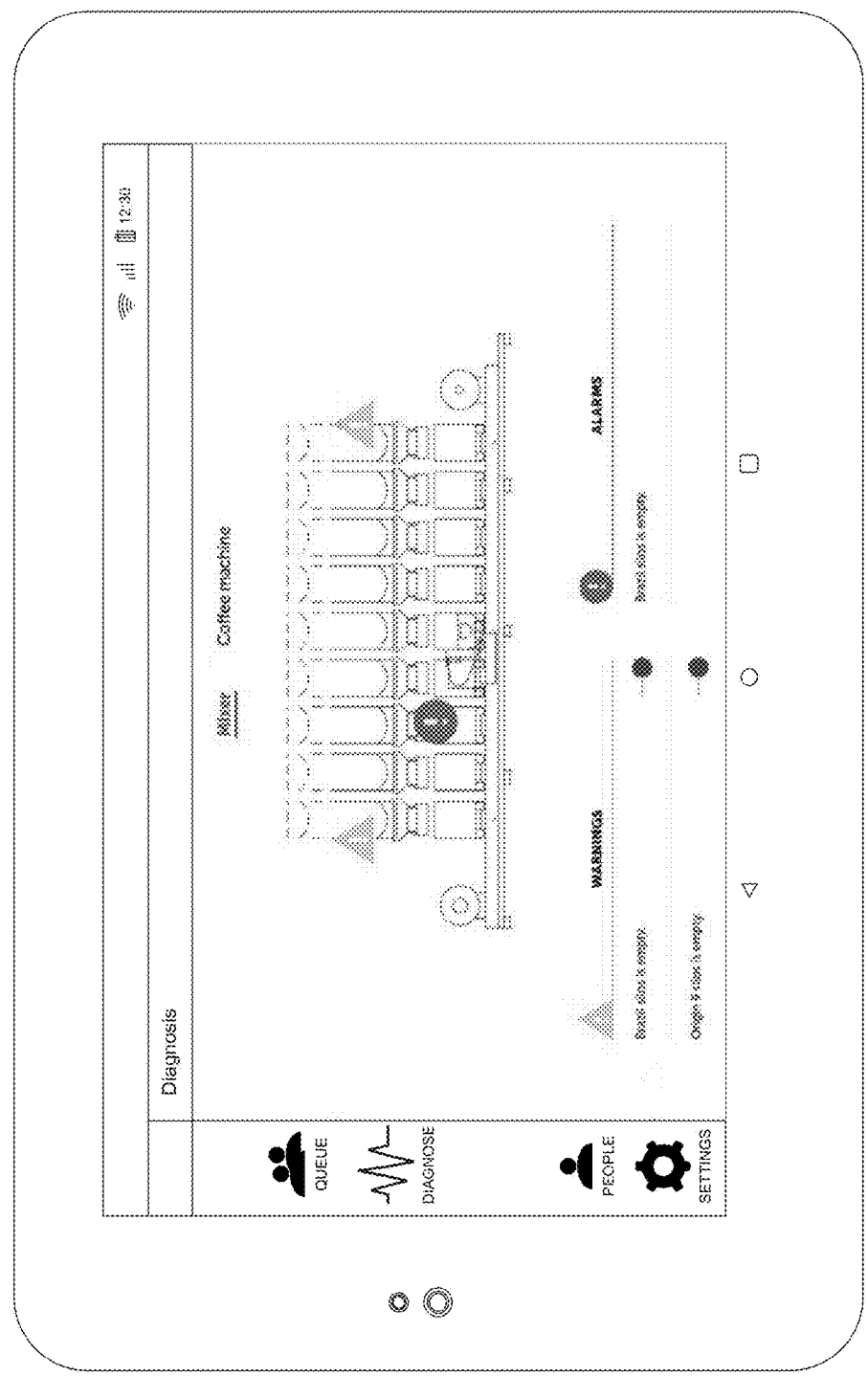

FIG. 13 shows an interface of the computer program code depicting the diagnostics of the formula personalized by the user. The diagnostics may include list of alerts and/or warnings about any preference made by the user during the personalization of the formula. For instance, the diagnostics can take into account the characteristics specified by the user such as sensory requirements or aromatic profile, or sporting and/or energizing and/or functional purposes of the beverage. For example, if in the preparation of the formula, the user has attempted to select or has selected a composition that has one or more components that are not suitable for the function specified by the user or not compatible with each other, or are excessive or limited in quantity, the computer program code may not allow the user to select the unsuitable or not compatible composition, according to possible predefined limiting values or bounds or may generate a warning and/or alarm.

The warning and/or alarm may also refer to unavailability of any of the component selected by the user to be present in the formula or ratios of the components in size and quantity that are not favorable. The computer program code may be further configured to advise the user that the formula has deficiencies and/or defects and provides the options to the user to choose from, to rectify the formula accordingly. Moreover, the warning and/or alarm may also refer to fail or malfunctioning of any of the components or units of the system according to the present invention.

As shown in FIG. 13, the diagnostics page can be divided for example into two sections, namely mixer and coffee machine. The user can navigate between the two sections by choosing the appropriate option on the interface shown in FIG. 13. The mixer section shows the warnings/alarms corresponding to the selector, measuring and mixer components of the coffee dispensing machine and the coffee machine section shows the warnings/alarms corresponding to the dispenser portion of the coffee dispensing machine.

The warnings and alarms can be depicted by corresponding icons such as but not limited to triangles, circles, squares, etc.

Figure 14:
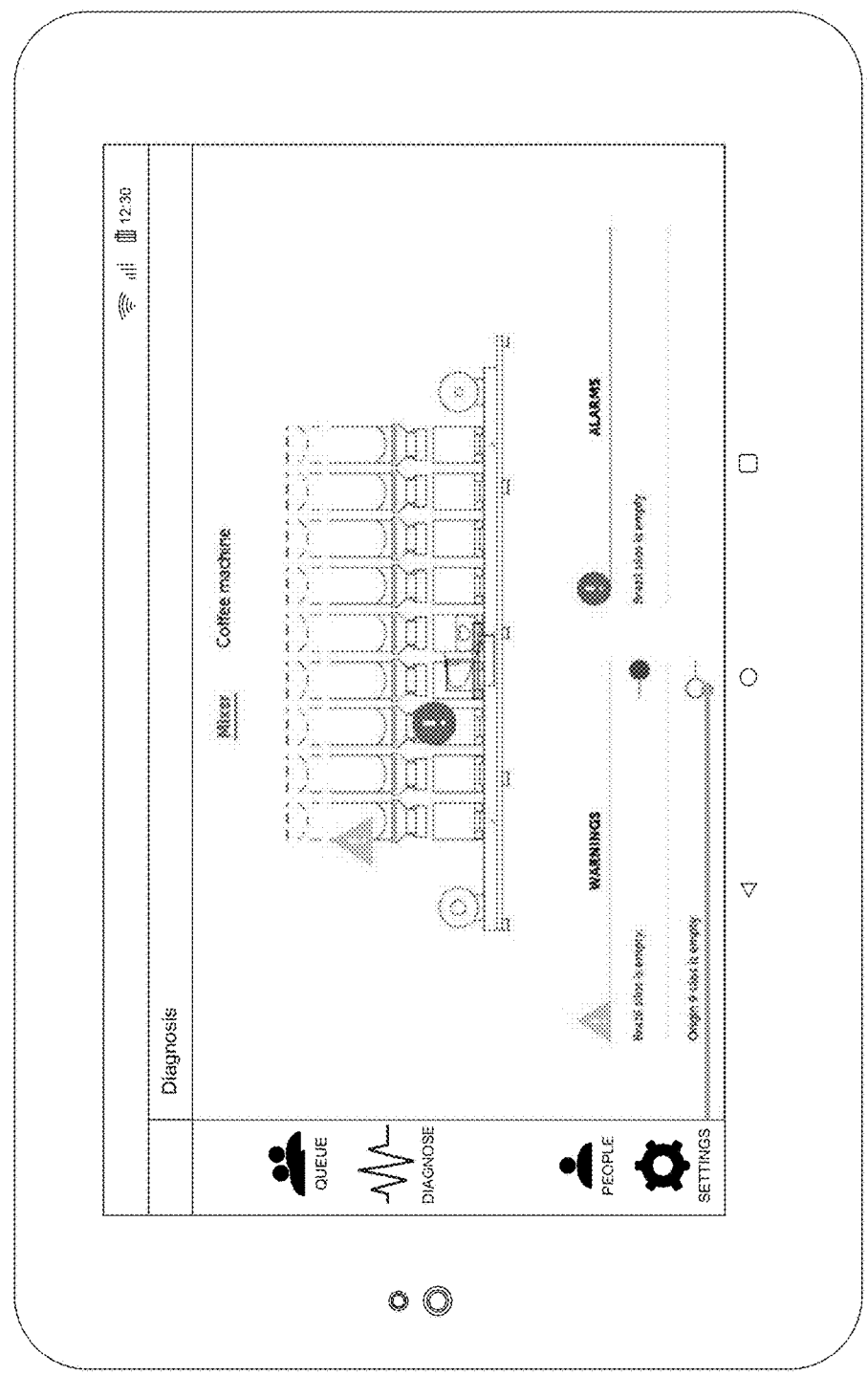

As shown in FIG. 14, the warnings feature of the computer program code can be switched off by the user but the alarms feature cannot be switched off.

Figure 15:
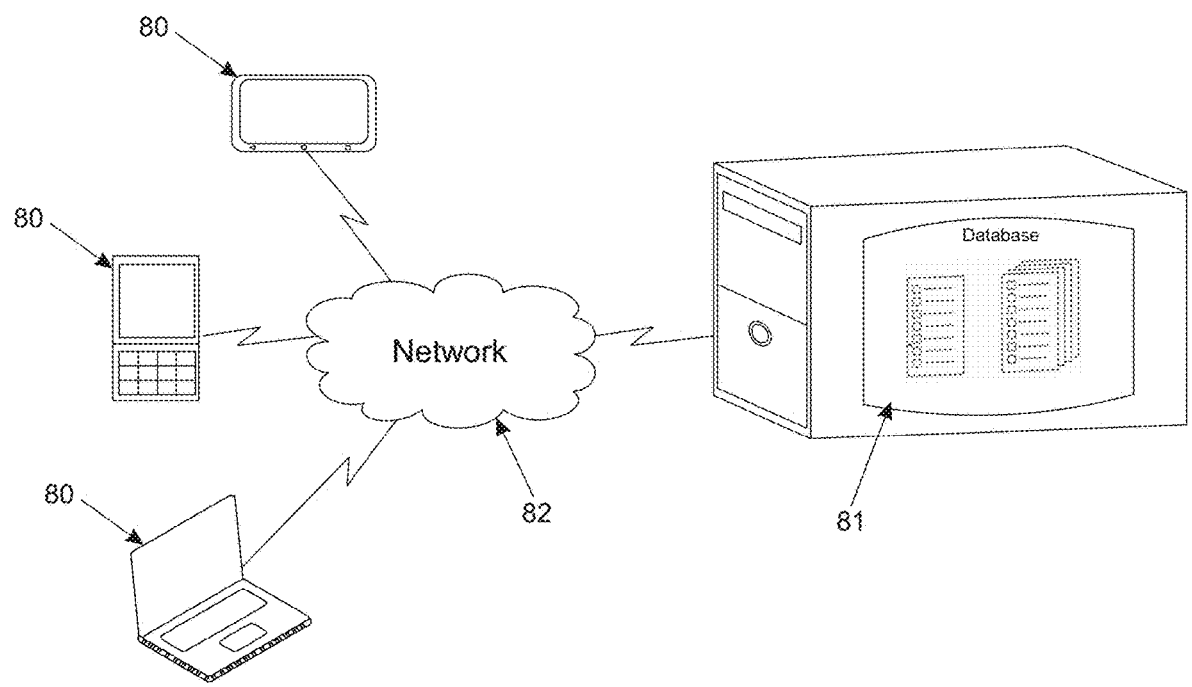
FIG. 15 shows a network of a plurality of user terminal and a database to store the personalized formulas.

With reference to FIG. 15, it will now be described that the personalized formula generated with the help of the computer program code of the invention can be stored in a database. FIG. 15 shows a plurality user terminals 80 and a database 81 connected to the user terminals 80 via a network 82. The network 82 may be a wireless or a wired cable connection. The user terminals 80 store the computer program code of the invention to enable users of the user terminals 80 to generate a personalized formula of mixtures. The personalized formulas generated by individual users of the user terminals 80 can be collected and stored in the database 81 via the network 82. The database 81 is accessible to each user of the user terminals 80 and each user can access a formula generated by any other user. The formulas are saved along with certain parameters associated with the formula. The certain parameter may be such as but not limited to a sensory profile, a purpose of the beverage, an origin profile, a type of blend, a territory, a geographic origin or area, a type of serving (such as powder, ground powder, grains/beans, flexible packs or bags, capsules, cartridges, pods or pads), etc. The formulas can be stored in the form of clusters in the database 81 on the basis of the parameters. For example a cluster of formulas may contain all the formulas having a common sensory profile, a cluster may contain all the formulas intended to obtain a beverage that serves a purpose of energizing drink, or a set of most recurrent formulas in a specific territory or geographic area, etc. Clustered formulas can be used to define stored clustered personalized preferences to be referred, or correlated, to other data for data analysis activities, like statistic analyses, big data analytics, etc. . . . . .

According to an embodiment of the invention, a username (or any other identity) of the user who uploads the formula can be associated with each formula. According to another embodiment of the invention, the formula can be kept anonymous.

According to an embodiment of the invention, the database can be placed within the user terminals, or within the beverage preparing devices, or at a third party platform.

It should be understood to an ordinary skilled in the art that the invention has been herein described, merely for example, for a beverage, but within the spirit of the invention, the description is also applicable for any other food item that is obtained by treating a mixture of substances.

Some embodiments of the method according to the present description can be included in a computer program storable in a mean readable by a computer that contains the instructions which, once executed by a system according to the present disclosure, determine the execution of the method according to the present disclosure. In particular, elements according to the present disclosure can be supplied as means readable by a machine to store the instructions that can be executed by the machine. The machine-readable means can include, without being limited to, floppy disks, optical discs, CD-ROM, and magneto-optical discs, ROM, RAM, EPROM, EEPROM, optical or magnetic boards, propagation means or other types of machine-readable means suitable to store electronic information. For example, the present invention can be downloaded as a computer program which can be transferred from a remote computer (for example a server) to a computer making a request (for example client), by data signals achieved with carrier waves or other propagation means, via a communication connection (for example a modem or a network connection).

It is also clear that, although the present invention has been described with reference to some specific examples, a person of skill in the art shall certainly be able to achieve many other equivalent forms of personalized devices to obtain and optimize mixtures able to generate personalized beverages, having the characteristics as set forth in the claims and hence all coming within the field of protection defined thereby.

The present invention is set forth and characterized in the independent claims, while the dependent claims describe other characteristics of the invention or variants to the main inventive idea.

What is claimed is:

1. A system for optimizing and preparing a coffee beverage according to a personalized formula of mixtures, said system comprising:

a data storage, storing computer program code that is able to be executed by a mobile electronic device, the computer program code stored in the data storage comprising:

computer program code for providing a user interface to receive a plurality of inputs from a user, wherein said plurality of inputs is intended to define at least a plurality of characteristics of the components of a mixture to be obtained, wherein the user interface is configured to provide options to modify and personalize the plurality of the characteristics of the components of the mixture to be obtained via an origin tab and a senses tab provided by the user interface, wherein when selecting the origin tab, the components of the origin of the coffee are shown by the user interface and when selecting the senses tab, the organoleptic and sensory characteristics of the mixture are shown by the user interface, wherein the user interface is configured to provide sliding cursors for varying the components for the corresponding origins in the origin tab and a radar graphic visualization depicting the organoleptic and sensory characteristics of the mixture according to senses tab, wherein the user interface is configured such that, when the components of the origin are customized via the sliding cursors in the origin tab, changes are reflected in the radar graphic visualization in terms of an incidence of a sensory profile in the senses tab;

computer program code for generating a personalized formula for the mixture to be obtained, wherein the personalized formula is generated in said mobile electronic device on the basis of said plurality of inputs provided by the user;

computer program code for transmitting the generated personalized formula of mixtures through a transceiver configured with the data storage;

a coffee preparing and dispensing machine configured for receiving the personalized formula of mixtures for preparing at least the mixture and the coffee beverage according to the personalized formula of mixtures, the coffee preparing and dispensing machine including at least:
- a selector unit comprising a plurality of containers of basic substances and a selection means configured to select at least one substance according to the received personalized formula;
- a measuring unit configured to measure the quantity of the selected substances according to the received personalized formula, wherein the measuring unit is further configured to mix the substances in a container;
- a grinding unit configured to grind the mixed substances according to the received personalized formula;
- a beverage preparing unit for preparing the coffee beverage according to the received personalized formula; and
- a management and control means configured to carry out functions of all the units of the coffee preparing and dispensing machine according to the received personalized formula, wherein the transceiver communicates the personalized formula to the coffee preparing and dispensing machine directly via a local area network.

2. The system of claim 1, wherein the generated personalized formula is conditioned and optimized, and has a balanced and coherent composition of the components of the mixture.

3. The system of claim 1, wherein the plurality of characteristics comprises at least origin profile, sensory profile, purpose of the coffee beverage, quantity of substances, extent of grinding, temperature, pressure, quantity of water, final volume of the coffee beverage, working time, and number of doses of the mixture.

4. The system of claim 1, wherein the computer program code is further configured to perform diagnostics of the generated personalized formula, wherein the diagnostics include identifying any errors present in the generated personalized formula.

5. The system of claim 4, wherein the errors comprise at least unavailability of any component, ratios of the components in size and quantity that are not favorable, presence of any component that is not suitable for the purpose of the coffee beverage defined by the user, presence of components which are not compatible with each other, or excessive or limited quantity of components.

6. The system of claim 4, wherein the computer program code is further configured to generate at least a warning or an alarm when an error is identified.

7. The system of claim 1, wherein the personalized formula controls dosage of the components of the mixture and contains instructions for preparing the coffee beverage.

8. The system of claim 1, wherein the data storage is a part of a user terminal.

9. The system of claim 1, wherein the data storage is a part of the coffee preparing and dispensing machine or a third party server.

10. The system of claim 1, wherein the computer program code further comprises computer program code for generating a queue of orders placed by user(s) related to personalized formulas, wherein the queue is used by the user to at least one of manage the status of the orders, control the status of the orders, and optimize the status of the orders.

11. The system of claim 1, wherein the computer program code further comprises computer program code for generating a queue of orders placed by user(s) related to personalized formulas, wherein the queue is used by the user to at least one of manage the priorities of the orders, control the priorities of the orders, and optimize the priorities of the orders.

12. The system of claim 1, wherein the computer program code further comprises computer program code for generating a queue of orders placed by user(s) related to personalized formulas, wherein the queue is used by the user to at least one of manage the number of the orders, control the number of the orders, and optimize the number of the orders.

13. The system of claim 1, wherein the radar graphic visualization is configured to be directly modified by the user by multi-touch gestures and the modifications provided to the radar graphic visualization directly modify or customize the components of the origin.

14. A method for generating personalized formula of mixtures and preparing a coffee beverage according to said personalized formula, the method comprising:
providing, by a user, a plurality of inputs into a computer program code at a mobile electronic device, through a user interface, wherein said plurality of inputs is intended to define at least a plurality of characteristics of components of the mixture to be obtained, wherein the user interface is configured to provide options to modify and personalize the plurality of the characteristics of the components of the mixture to be obtained via an origin tab and a senses tab provided by the user interface, wherein when selecting the origin tab, the components of the origin of the coffee are shown by the user interface and when selecting the senses tab, the organoleptic and sensory characteristics of the mixture are shown by the user interface, wherein the user interface is configured to provide sliding cursors for varying the components for the corresponding origins in the origin tab and a radar graphic visualization depicting the organoleptic and sensory characteristics of the mixture according to senses tab, wherein the user interface is configured such that, when the components of the origin are customized via the sliding cursors in the origin tab, changes are reflected in the radar graphic visualization in terms of an incidence of a sensory profile in the senses tab;
generating, by the computer program code, a personalized formula for the mixture to be obtained, wherein the personalized formula is generated in said mobile electronic device on the basis of said plurality of inputs provided by the user;
communicating, by the computer program, the generated personalized formula of mixtures to a coffee preparing and dispensing machine directly via a local area network, wherein the coffee preparing and dispensing machine is configured to prepare at least the mixture and the coffee beverage according to the personalized formula of mixtures;
selecting, by a selector unit of the coffee preparing and dispensing machine, at least one substance from a plurality of basic substances contained in a plurality of containers according to the received personalized formula;
measuring, by a measuring unit of the coffee preparing and dispensing machine, quantity of the selected substances according to the received personalized formula, wherein the measuring unit is further configured to mix the substances in a container;

grinding, by a grinding unit of the coffee preparing and dispensing machine, the mixed substances according to the received personalized formula;

preparing, by a beverage preparing unit of the coffee preparing and dispensing machine, the coffee beverage according to the received personalized formula; and controlling, by a management and control means of the coffee preparing and dispensing machine, functions of all the units of the coffee preparing and dispensing machine according to the received personalized formula.

15. The method of claim 14, wherein the generated personalized formula is conditioned and optimized, and has a balanced and coherent composition of the components of the mixture.

16. The method of claim 14, wherein the plurality of characteristics comprises at least origin profile, sensory profile, purpose of the coffee beverage, quantity of substances, extent of grinding, temperature, pressure, quantity of water, final volume of the coffee beverage, working time, and number of doses of the mixture.

17. The method of claim 14, wherein the computer program code further performs diagnostics of the generated personalized formula, wherein the diagnostics include identifying any errors present in the generated personalized formula.

18. The method of claim 17, wherein the errors comprise at least unavailability of any component, ratios of the components in size and quantity that are not favorable, presence of any component that is not suitable for the purpose of the coffee beverage defined by the user, presence of components which are not compatible with each other, or excessive or limited quantity of components.

19. The method of claim 17, wherein the computer program code further generates at least a warning or an alarm when an error is identified.

20. The method of claim 14, wherein the personalized formula controls dosage of the components of the mixture and contains instructions for preparing the beverage.

21. The method of claim 14, further comprising generating, by the computer program code, a queue of orders placed by user(s) related to personalized formulas, wherein the queue is used by the user to at least one of manage the status of the orders, control the status of the orders, and optimize the status of the orders.

22. The method of claim 14, further comprising generating, by the computer program code, a queue of orders placed by user(s) related to personalized formulas, wherein the queue is used by the user to at least one of manage the priorities of the orders, control the priorities of the orders, and optimize the priorities of the orders.

23. The method of claim 14, further comprising generating, by the computer program code, a queue of orders placed by user(s) related to personalized formulas, wherein the queue is used by the user to at least one of manage the number of the orders, control the number of the orders, and optimize the number.

24. The method of claim 14, wherein the radar graphic visualization is configured to be directly modified by the user by multi-touch gestures and the modifications provided to the radar graphic visualization directly modify or customize the components of the origin.

* * * * *